United States Patent [19]

Klingman

[11] Patent Number: 5,680,589
[45] Date of Patent: Oct. 21, 1997

[54] RING COMMUNICATION SYSTEM USING ISDN

[76] Inventor: Edwin E. Klingman, 3000 Highway 84, San Gregorio, Calif. 94074

[21] Appl. No.: 486,007

[22] Filed: Jun. 8, 1995

[51] Int. Cl.$^6$ .................................................... H04L 12/28
[52] U.S. Cl. ..................... 395/500; 395/200.21; 370/901; 370/904
[58] Field of Search ............... 395/500, 182.02, 395/200.21; 364/900; 370/110.1, 58.1, 84, 17, 94.2, 60, 60.1, 85.2, 901, 904

[56] References Cited

U.S. PATENT DOCUMENTS

| | | | |
|---|---|---|---|
| 5,007,017 | 4/1991 | Kobayashi | 364/900 |
| 5,291,492 | 3/1994 | Andrews et al. | 370/110.1 |
| 5,361,255 | 11/1994 | Diaz et al | 370/58.1 |
| 5,361,259 | 11/1994 | Hunt et al. | 370/84 |
| 5,473,771 | 12/1995 | Burd et al. | 395/182.02 |
| 5,506,834 | 4/1996 | Sekihata et al. | 370/17 |
| 5,506,846 | 4/1996 | Edem et al. | 370/94.2 |
| 5,511,070 | 4/1996 | Lyles | 370/60 |
| 5,519,698 | 5/1996 | Lyles et al. | 370/60 |
| 5,526,353 | 6/1996 | Henley et al. | 370/60.1 |
| 5,528,587 | 6/1996 | Galand et al. | 370/60 |
| 5,535,211 | 7/1996 | Yano | 370/85.2 |

OTHER PUBLICATIONS

"Evolving Wide–Area Networking Capabilities", by R. Weber and G. Hoover, IEEE, Eascon '88:21st Annual Electronics and Aerospace Conference, pp. 35–40.

"Some Experience with LAN Interconnection via Frame Relaying", by J. Lamont and M. Hui, IEEE Network Magazine, Sep. 1989, pp. 21–24.

"A Protocol Architecture for Transport Services in B–ISDN", by Butscher et al., IEEE, Future Trends of Distributed Computing Systems, '90 Workshop, pp. 428–434.

"Interworking IEEE 802/FDDI LAN's via the ISDN Frame Relay Bearer Service", by P. Marsden, Proceedings of the IEEE, vol. 79, No. 2, Feb. 1991, pp. 223–229.

"Open issues regarding the universal application of ATM for multiplexing and switching in the B–ISDN", by M. Decina, Communications, 1991 IEEE International Conference, Mar. 1991, pp. 39.4.1–39.4.7.

"Whither broadband–a perspective on wide–area networking", by J. Atkins and S. Lawer, Broadband Services, Systems, and Networks, 1993 (IEE Conf. Pub. 383), pp. 13–17.

"Frame Relaying as a Common Access to N–ISDN and B–ISDN Data Services", by R. Guarneri and Co. Lanting, IEEE Communications Magazine, Jun. 1994, pp. 39–43.

"Emerging Packet Network Technologies and Services", by N. Ahmad and M. Verma, IEEE, ICCS '94 (Singapore), Aug. 1994, pp. 1158–1163.

"Fault Tolerant Token Ring Model Development", by T. Gilbar and S. Wunnava, Southeastcon, 1995 IEEE Conference Proceedings, Mar. 1995, pp. 123–127.

©1995 *Programmer's WinISDN SDK* (Visual Basic Programmer's Manual), ISDN*tek, San Gregorio, CA.

Primary Examiner—Kevin J. Teska
Assistant Examiner—Russell W. Frejd
Attorney, Agent, or Firm—Claude A. S. Hamrick

[57] ABSTRACT

Ring communication system using ISDN including terminal adapter hardware and associated software that can be combined with a general purpose computer and used to provide a work station or party unit which can be linked together with other similarly configured units via the ISDN to provide a closed wide area network. Although the system can be implemented on any type of computer using any programming language, in the preferred embodiment proprietary software designated WinISDN.DLL in a Microsoft Windows™ environment is used to implement a novel algorithm in Visual Basic or C–language programming systems. The hardware aspects of the invention are provided in a terminal adapter card that includes a dual port RAM, an ISDN controller, and a subscriber access controller. The adapter card plugs into the (E)ISA bus that is the PC standard bus/backplane.

20 Claims, 2 Drawing Sheets

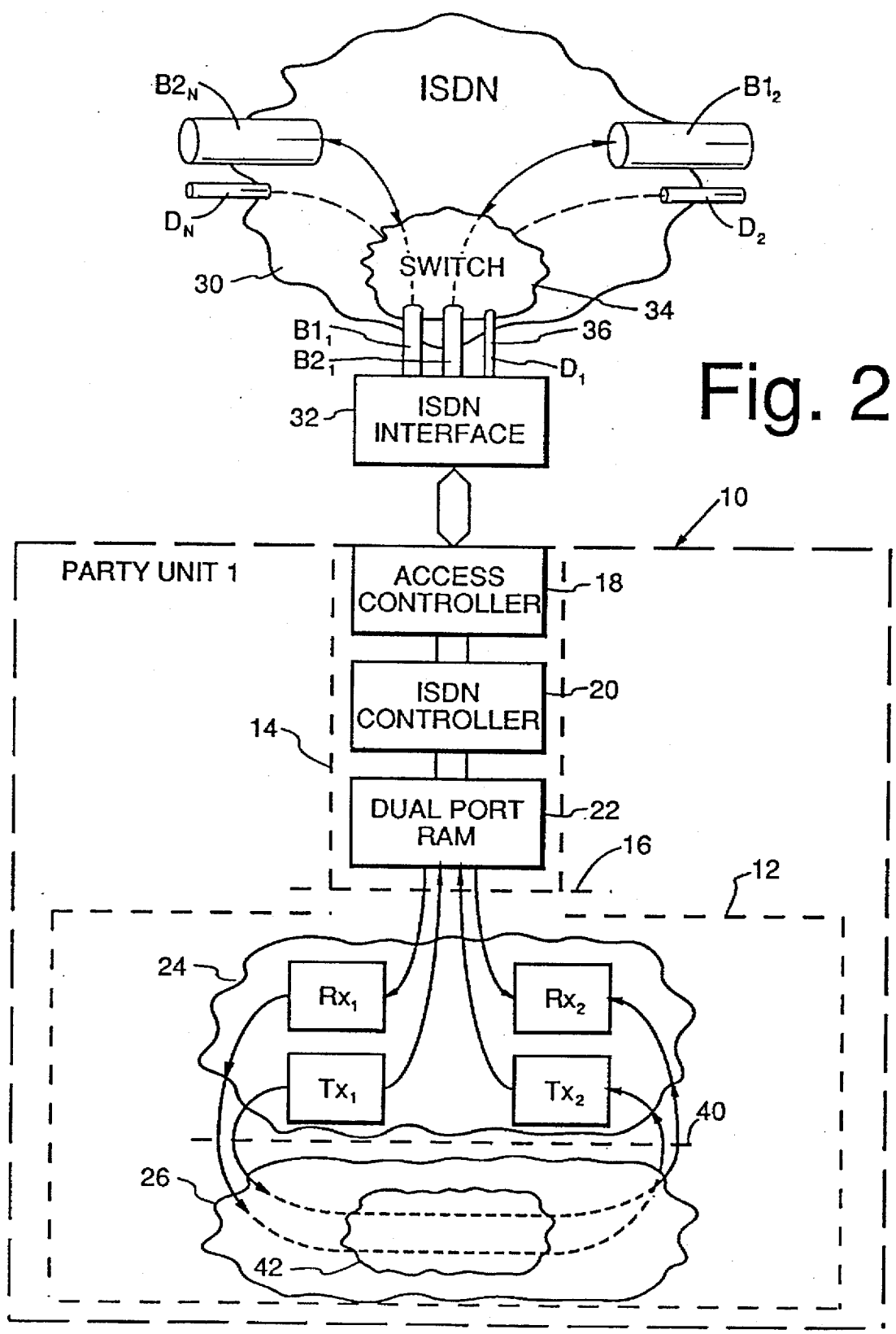

RING COMMUNICATION SYSTEM USING ISDN

BACKGROUND OF THE INVENTION

1. Field of the Invention

The present invention relates generally to communication networks having ring topology, and more particularly to a wide area network architecture using the ISDN system and having ring topology and startup procedure offering inherent security.

2. Brief Description of the Prior Art

The advantages of local area networks (LAN) for linking a plurality of work stations together in a ring topology are well known. However, there is currently no equivalent wide area network (WAN) having equivalent characteristics. Although work groups can be implemented in wide area networks using other topologies, such networks do not provide simple interconnections between parties which will allow any party to communicate with any other party without substantial restriction. Generally, any "direct dialing" technology will experience "collisions". More specifically, if "on-demand" connections are attempted, there will be instances in which several parties will attempt to call a particular party. If more than two calls to the particular party occur at the same time, they will "collide", and one or more will receive a "busy" signal from the switch, i.e., the call will fail. Even when two parties succeed in calling a third party, the third party is then prevented from communicating with any of the remaining parties for the duration of the two calls.

Prior art LAN technologies, both EtherNet and Token Ring, primarily depend on high-speed transmission over relatively short distances using shared media subject to collisions. EtherNet survives collisions by sensing them and retrying according to an appropriate algorithm. Token Rings avoid collisions by passing a "token" or "permission to transmit" Prior art WANs use modem technologies, or the equivalent, to maintain point-to-point links. In all cases, "wide area" equates to "long lines", and the expense of the physical wiring media generally precludes multiple links, i.e., multiple wires.

ISDN technology, publicly deployed about 1990, offered two 64K data links over the same physical media. However, several factors prevented ring topologies from being used with the ISDN. First, available hardware and software did not support ISDN ring architecture. Second, habits of mind (and the availability of software based on COM ports) led most users to think of ISDN as simply a "fast modem". This was evidenced by the fact that most manufacturers of ISDN terminal adapters for PCs offered neither voice support nor D-channel X.25 support, and offered, for the most part, only one B-channel of transfer capability. The few manufacturers that did offer two-channel capability almost universally treated the two B-channels as a way to achieve 128K transfers as opposed to two independent 64K data channels. Most ISDN applications have focused on point-to-point connections between two LANs (bridging), or between a user and a LAN, or a user and the Internet. For these and perhaps other reasons, no ISDN ring architecture has previously been implemented.

However, because the ISDN provides two independent B-channels of communication, as well as a third D-channel which can be used to establish communication links for the B-channels, the ISDN system offers a unique opportunity for implementation of a novel wide area network having ring topology.

SUMMARY OF THE PRESENT INVENTION

It is therefore a principal objective of the present invention to provide a novel method and apparatus by which a plurality of remote voice and/or data communication units can be linked together in a closed network.

Another objective of the present invention is to provide a method and apparatus of the type described which permits simple connection between all party units using the maximum bandwidth available in the Basic Rate ISDN.

Still another objective of the present invention is to provide a method and apparatus of the type described which provides a "collision-free" topology in which all party units can transmit and receive to and from any other party unit on the ring, subject only to the per-node buffering delays which are, for most purposes, negligible.

Yet another objective of the present invention is to provide a method and apparatus for implementing a novel wide area network having a high level of security.

Briefly, a preferred embodiment of the present invention includes terminal adapter hardware and associated software that can be combined with a general purpose computer and used to provide a work station or party unit which can be linked together with other similarly configured units via the ISDN to provide a closed wide area network. Although the system can be implemented on any type of computer using any programming language, in the preferred embodiment proprietary software designated WinISDN.DLL in a Microsoft Windows™ environment is used to implement a novel algorithm in Visual Basic or C-language programming systems. These programming systems are preferred because they are probably the most widely used general purpose systems available on the 50 million+ IBM-PC-compatible computers that run Microsoft Windows™. The hardware aspects of the invention are provided in an interfacing terminal adapter card that includes a dual port RAM, an ISDN controller, and a subscriber access controller. The adapter card plugs into the (E)ISA bus that is the PC standard bus/backplane.

The key functions used to implement the algorithms are:

"Listen_for_connection( )". . . (incoming on either B-channel),

"Accept ( )". . . (Connection when incoming call detected),

"CONNECT( )". . . (to next party in ring).

Using these function calls, each party unit in the ring can implement a Ring Startup Procedure that waits for an incoming call, determines whether to accept or reject the call, and if accepted, connects to the next node in the ring. The next node executes an identical Ring Startup Procedure using appropriate local values to validate/authenticate the incoming call. These functions are used to automatically link the ring network when the first call is transmitted by any one unit and received by a second unit.

An important advantage of the present invention is that, in contrast to the above-mentioned "collision" topologies, the present invention provides a "collision-free" topology in which all parties can transmit and receive to and from any other party on the ring, subject only to the per-node buffering delays which are for most purposes negligible.

Another advantage lies in the fact that fully linked rings cannot be penetrated since all B-channels of all units are busy. This security can be enhanced by other means, but the basic security associated with fully linked rings is inherent in the architecture.

Still another advantage of the present invention is that once the ring is linked, any party can "broadcast" to all other parties. However, the most useful communication scheme uses headers specifying the source and destination of each message. In this manner, each node can check the destination of every packet, and if the destination address matches the local address of the node (party), then the local node will remove the message from the ring and process the message. If the destination address is not equal to the local address, then the local node simply re-transmits the message on the other B-channel, i.e., the B-channel other than the one from which the message was received.

If the destination address has the value "broadcast" (customarily all "1"s in the destination field) and the source address is unequal to the local address, then the message is re-transmitted. When the source address equals the local address, the message has completed the circuit and is not re-transmitted, thus preventing endless looping. In this fashion any user/node on the ring can broadcast to all other users/nodes in a reliable, simple fashion.

These and other objects and advantages of the present invention will no doubt become apparent to those skilled in the art after having read the following detailed description of the preferred embodiment which is illustrated in the several figures of the drawing.

IN THE DRAWING

FIG. 1 is a diagram generally illustrating a network using an ISDN ring architecture in accordance with the present invention. FIG. 2 is a diagram schematically illustrating the principal components of a party unit and its connection to the ISDN in accordance with the present invention.

DETAILED DESCRIPTION OF THE PREFERRED EMBODIMENT

Figure 1:
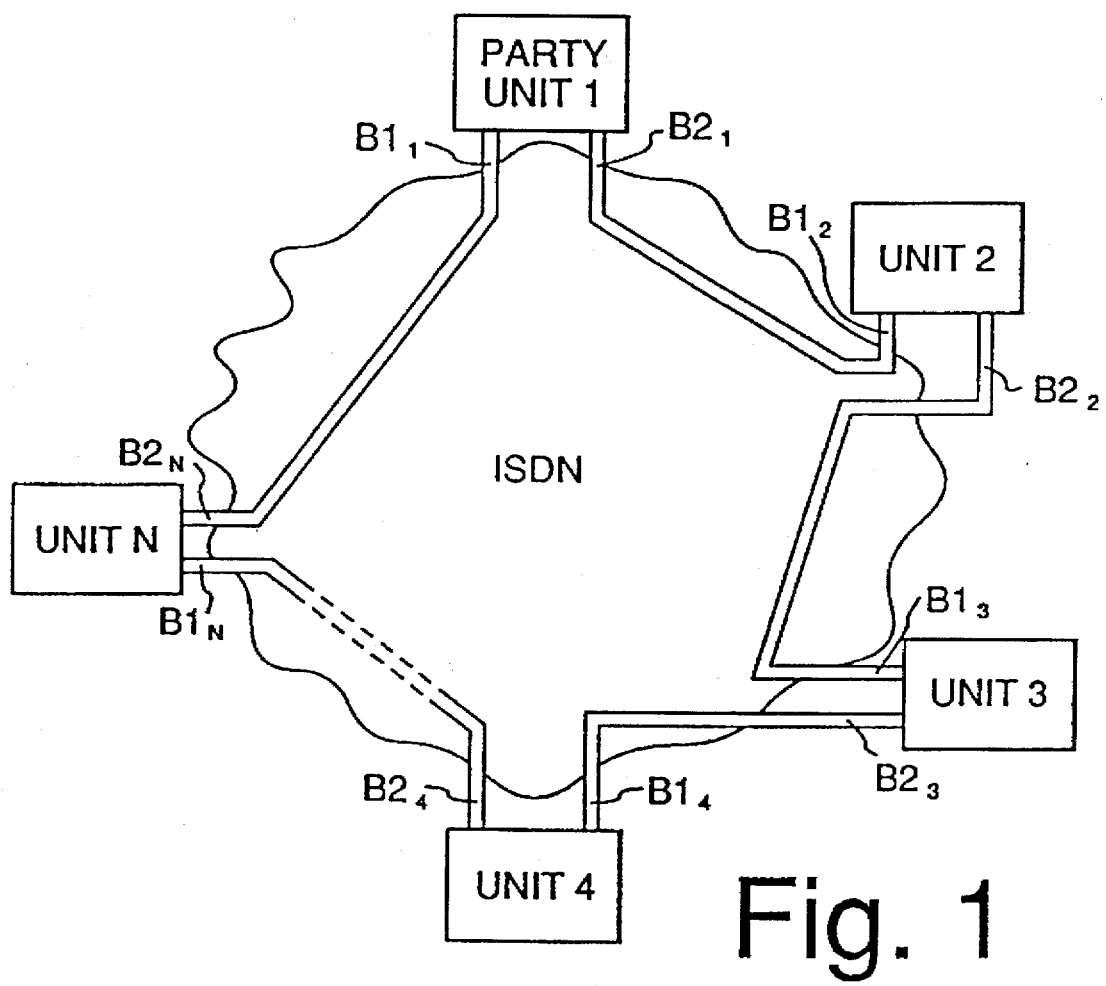

The Basic Rate ISDN node connection provides two 64K-bit/sec bearer channels (B1 and B2) and a 16K-bit/sec signalling/data packet channel (D). The Basic Rate interface is called 2B+D. All three of the channels are orthogonal to each other, and each of the channels is synchronous and full duplex. As will be described below, these features allow for the provision of a unique ring architecture, as illustrated in FIG. 1 of the drawing. In essence, if N parties, e.g. party units 1, 2, . . . N illustrated in the drawing, possess Basic Rate interface equipment of the type to be described below, then party 1 can place a call using one of its B-channels ($B2_1$, for example) to call party 2 on one of the B-channels of party 2 (for example, $B1_2$). Party 2 can then use its second B-channel ($B2_2$) to place a call into party 3 through its $B1_3$ channel, which in turn can use its second B-channel ($B2_3$) to call a fourth unit, et cetera, until party N uses its second B-channel ($B2_N$) to call party 1 via its unused channel ($B1_1$), thereby closing the N-element ring.

Unlike local area network (LAN) "TOKEN" rings in which only one node/unit can use the ring at any given time, and a token is passed as a "permission" to use the ring, the above architecture allows all of the N parties to send and receive information simultaneously. In fact, all of the N parties can send in both directions, i.e., to each of its adjoining neighbors simultaneously. This of course requires buffering at each node. However, since all B-channel data communications require buffering, this is not an unusual constraint.

The Basic ISDN Ring Startup Algorithm is as shown below:
Begin_Ring_Startup
 ISDN_Open(ISDN_board)
 ISDN_Listen_for_Connection(Call_Structure, Event_Structure)
 ISDN Event Notification Handling
 Incoming Call Validation Procedure
 ISDN_Accept(Call_handle) [or Reject( ) and Re-Listen( )]
 ISDN_Connect(Call_Struct, Event_Structure)
End_of_Ring_Startup All function names beginning with "ISDN_" correspond to WinISDN function names. WinISDN is an ISDN software interface application produced by ISDN*tek of San Gregorio, Calif. The source code listings of WinISDN are given in the programmer's guide entitled *"Programmer's WinISDN SDK"* published by ISDN*tek of San Gregorio, Calif. The first function, ISDN_Open( ), specifies the ISDN terminal adapter board to be opened. This function prepares the system interrupt structure and allocates system memory, and defines the system addresses used by the unit's terminal adapter (as described below). The call returns success or error codes to the application attempting to "open" the ISDN board.

The next major operation involves the ISDN_Listen_for_Connection( ) function which passes two structures to the WinISDN driver module. The first structure specifies the type(s) of calls to be listened for via a Listen_Mask that contains a "1" in each location corresponding to a desired Call_Type and a "0" in each location that corresponds to a Call_Type to be rejected. Note that this mechanism is useful for security, as well as simply restricting the incoming call types to those to be used by the ring members. The event structure that is passed to the driver specifies the type of event notification mechanism to be used in reporting systems' events such as an incoming call of a qualified type. WinISDN allows callbacks, polling, and Windows message passing, although other mechanisms are possible in other implementations. The ISDN_Listen_for_Connection( ) call will return a Call_Handle that is to be associated with the first incoming call that passes the Listen_Mask filter.

The event notification handling procedure uses the appropriate method for the notification mechanism specified in the ISDN_Listen_for_Connect( ) function call. The Windows™ operating system, like many others, is non-preempting, and therefore "blocking" function calls do not exist. (Note that OS/2™ uses preemptive multi-tasking, and an equivalent blocking algorithm based on threads has been implemented.) Blocking function calls "put themselves to sleep" and relinquish the system until the desired event "wakes them up". Non-blocking functions must return immediately, because system resources are tied up while execution is in the function call. Since the events of interest in most WANs depend on the actions of remote parties, it is clear that an application cannot simply wait for an event, tying up system resources while waiting. Instead, the event notification mechanisms provide a means of re-invoking the function when the awaited event occurs, thereby effectively "waking up" the function and allowing it to perform the appropriate action or response. This is the rationale for the event notification handling procedure that is executed when the qualified incoming call arrives.

When the incoming call event occurs, the Ring Startup Procedure is notified and presented with an opportunity to validate the incoming call in terms of security, etc. There are numerous mechanisms possible for validating the incoming call, but most will be based either on communications from the switch, or communications from the incoming caller. For example, communications from the switch may include the incoming caller identification information element, while communications from the caller may include a unique serial number or other identifying means. The ISDN Ring Architecture does not depend on the details of the validation mechanism; indeed, there may be no validation performed in some cases. The details will depend upon the required security for a specific application of the ISDN Ring Architecture.

If the validation of the incoming call is positive, then the ISDN_Accept( ) function call is made using the Call_Handle returned by the Listen_for_Connection( ) function. If the incoming call fails the validation procedure, then ISDN_Reject( ) should be called.

When the incoming call has been accepted (on one B-channel), the Ring Startup Procedure then issues an ISDN_Connect( ) function call to the next neighbor in the ISDN Ring, based on whatever previously stored information about ring topology is available. At a minimum, this includes the ISDN directory number of the next ring member to be linked into the ring, and also the Call_Type of the call to be used to link the member. (Obviously this Call_Type must be acceptable to the next ring members Listen_Mask or else the link will fail.) A Call_Handle is returned when the function call succeeds. This handle will be used to identify events associated with this connection. Note that the return of the Call_Handle does not indicate that the call is connected, only that the system has been prepared for the connection when the far end accepts the call. If the next ring member accepts the call, the specified event notification mechanism informs the system, and the current ring member is linked to two adjoining nodes in the ring topology. The next ring member, after accepting this incoming call, will place an outgoing call to the next member, and so on, until the last ring member calls the first, thereby completing the link. Note that each member will accept a call on one of its B-channels, and place a call on the other of its B-channels. This ring closure provides the inherent security discussed elsewhere.

Referring now to FIG. 2 of the drawing, details relating to the make-up of each terminal or party unit will be given. As generally depicted, each party unit 10 includes a general purpose computer 12, such as an IBM PC or compatible, having an interfacing terminal adapter card 14 (such as the Cyberspace Commuter Card manufactured by ISDN*tek, Inc. of San Gregorio, Calif.) plugged into its (E)ISA bus, signified by the dashed line 16. The adapter card 14 includes a subscriber access controller 18 (physical interface device, typically a Siemens PEB2085 or equivalent), an ISDN controller 20 (a Cybernetic Microsystems CY123), and a dual port RAM 22. Installed in computer 12 is a physical device driver, generally illustrated at 24, and a ring architecture application, generally illustrated at 26. The adapter card 14 communicates with the ISDN 30 by means of a network terminator or ISDN interface 32, typically an S/T or U interface, via an ISDN switch 34 that couples one of the B-channels ($B1_1$) of unit 10 to one of the B-channels ($B2_N$) of a remote unit N, and connects the second B-channel ($B2_1$) to one of the B-channels ($B1_2$) of a party unit 2.

The Ring Startup Procedure begins when the ISDN switch 34 receives an incoming call on channel $B2_N$ sent by call signaling performed on a D-channel $D_N$. If the application 26 of party unit 1 is "Listening_for_Connection" as is assumed in the Ring Startup Procedure, then the incoming call will be accepted. Note that the application 26 communicates with the ISDN switch 34 via the D-channel $D_1$ indicated at 36. The ISDN terminal adapter 14 connects to the ISDN Basic Rate interface $\{2B+D=(B1_1)+(B2_1)+(D_1)\}$ via the physical interface device 32. This device is controlled by the access controller 18 which handles the Q.921 protocols necessary to establish a data link with the switch, and the Q.931 network protocols that specify the communication over the data link. The ISDN controller 20 communicates with the device driver 24 via the dual port RAM "mailbox" 22, which is interfaced to the PC (E)ISA bus 16. All of these devices are described in more detail in my co-pending U.S. patent application entitled "BYTE ALIGNED COMMUNICATIONS SYSTEM FOR TRANSFERRING DATA FROM ONE MEMORY TO ANOTHER MEMORY OVER AN ISDN", Ser. No. 08/370,965 filed Jan. 10, 1995, and expressly incorporated herein by reference. The driver 24 is the WinISDN.DLL (or .Vxd or .Obj or .Sys, etc., depending on operating system) manufactured by ISDN*tek, Inc., and runs on the IBM PC 12 or compatible, which directly communicates with the terminal adapter 14 across the (E)ISA bus 16. The WinISDN driver manages receive buffers $Rx_1$ and $Rx_2$, and transmit buffers $Tx_1$ and $Tx_2$. The buffers $Rx_1$ and $Tx_1$ hold data received from or sent to the $B1_1$-channel, while the buffers $Rx_2$ and $Tx_2$ hold data received from and transmitted to the $B2_1$-channel.

The ISDN ring architecture application 26 communicates with the driver 24 via an application programming interface (API) 40 which is preferably the WinISDN API manufactured by ISDN*tek, Inc. The Ring Startup Procedure performs the Listen_for-connection( ) function call. When the incoming call on $B2_N$ arrives, the application issues the ACCEPT( ) function call. The ISDN switch 34 then connects $B2_N$ to $B1_1$, establishing a 64K-channel from the caller to the application 26. The Ring Startup Procedure then performs a CONNECT( ) function call across the API 40, and the driver 24 causes the controller 20 to communicate with the ISDN switch 34 via the D-channel 36. The switch 34 then places the call to connect $B2_1$ to one of the channels $B1_2$ of a second party unit (unit 2, FIG. 1). When unit 2 accepts the call (using its own Ring Startup Procedure), the switch 34 connects $B2_1$ to $B1_2$ and alerts the application 26 via the D-channel 36, the controller 20 and the driver 24 event notification mechanism.

At this point, the three ring members (units N, 1 and 2) are interconnected. The application processes the full duplex data to and from the buffers $Rx_1$ and $Tx_1$ that is exchanged over the $B2_N$–$B1_1$ connection to the ring member N and initiates the incoming call. The application also processes the full duplex data to and from buffers $Rx_2$ and $Tx_2$ that is exchanged over the $B2_1$–$B1_2$ connection to the ring member (unit 2) that accepted the application's outgoing call. A data processing subsystem 42, forming a part of application 26, determines which data to transmit or re-transmit, and which to process locally, based on the destination and source addresses associated with the data, and on local control by the user or user agents associated with this ring member.

Each ring member implements a system equivalent to the above, thereby achieving a fully linked ISDN ring. When the ring is linked, all members can interact via two full duplex B-channels. Communications on the ring are achieved in the preferred implementation via two WinISDN function calls: ISDN_READ( ) and ISDN_WRITE( ). Each function call passes a CALL_HANDLE that is used to identify which of the two B-channels is to be used for the communications. The ISDN READ( ) also causes a buffer to hold the data read from the B-channel. The ISDN_WRITE( ) passes a pointer to a data packet to be written into the appropriate B-channel. Note that, depending upon the call-type specified in the Ring Startup Procedure, the data may either be HDLC packets or may be streaming (byte-oriented) data. The WinISDN event notification mechanism allows the application program to be informed when data is available to be read, and similarly, when the transmit buffer is available for data to be written. This asynchronous event mechanism allows management of the buffers that hold data sent to and received from the synchronous 64K B-channels of the ISDN Basic Rate interface 32.

While the above scheme is sufficient for an ISDN Ring Architecture, it can be extended in many ways via the use of out-of-band X.25 communications. This disclosure does not detail these possible connections, but by implication, all such connections between ring members and/or non-ring members are included.

Although considerable emphasis has been placed on the inherent degree of security associated with a fully linked, closed ring, it is also possible to unlink the ring between two given ring members, and add a new ring member to the ring, with subsequent relinking to each on the unlinked members. Similarly, one member can unlink from one neighbor, then the other, and the two neighbors of the (now totally) unlinked member can then relink to each other. Thus one can easily add or drop members from an ISDN WAN Ring. The unlinking and relinking procedures can be accompanied by various security schemes; however, its main advantage may reside in its malleability. Members can be dropped from or added to work groups as conditions require.

Examples of applications of the architecture are:
1. Work groups (white board, etc.),
2. Multi-player games,
3. MIDI WAN "bands", and
4. Distributed real-time control systems.

The fully linked feature of the ring architecture allows Ring Closure to be treated as a security firewall, i.e., as a means of preventing outside access to users on the ring. Once the ring establishes closure, there is no means to surreptitiously break the ring and enter the ring. This means that after a suitably secure ring closure is achieved, ring security is simple to maintain and monitor. Any break in the ring can be easily signalled to all remaining parties and the breach of ring security acted upon. Note that in addition to the natural closure afforded by the two B-channels, it is usually possible to subscribe to Basic Rate ISDN line translations that enhance the security of the ring. For example, "Call Waiting" is a feature that should not be subscribed to if security is to be maximized.

Via X.25 or other communication channels, the ring can be broken and healed by one party leaving, or by another party entering, the ring. Because the ring is a "closed" communication channel, it is preferred that the D-channel X.25 packets initiate and coordinate growth and shrinkage as members leave or are added to the group. Since this feature tends to violate the "firewall" aspect of ring closure, it should normally be accompanied by other compensating security features, such as might be obtained with individual security ID numbers, use of Caller ID, and any other appropriate measures. Note also that X.25 Closed User Groups offer significant secure facilities that can be used to maximize the safety of unlinking and relinking the ring.

The closed ring architecture is not intended to exclude other communication channels; for example, in addition to B-channel connectivity, the ring members may also communicate via X.25 packets on the D-channel. Some or all ring members may also possess secondary or other Basic Rate interface boards; i.e., any ring member may have access to more than two B-channels, thereby allowing a ring connection plus other B-channel connections. In any such extension the ring topology aspects of the system should take precedence over those features which allow the ring paradigm to be violated.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. Apparatus for establishing a geographically dispersed, wide area network communications ring using the ISDN to interconnect a plurality of functionally equivalent terminal units, each said terminal unit being coupled to a network termination means and comprising:

computer means;

interfacing adapter means associated with said computer means and operative to communicate data between said computer means and the network termination means; and application software for execution by said computer means and operative to cause said adapter means to perform an initial call establishment procedure with a second terminal unit to enable communication therewith over a first ISDN synchronous B-channel, and to perform an automatic next-link establishment procedure with a third terminal unit, and to enable communication therewith over a second ISDN synchronous B-channel and to conduct simultaneous bi-directional communications via said first and second B-channels between said plurality of terminal units.

2. Apparatus as recited in claim 1 wherein said adapter means includes:

means for interfacing to said ISDN synchronous B-channels via signaling D-channel packets;

buffering means for receiving and transmitting messages from/to said B-channels;

decoding means for analyzing address portions of received messages for local and broadcast connections;

encoding means for constructing address portions of messages for local and broadcast communications over said B-channels;

authentication means for validating ring security during the conduct of said next-link establishment procedure;

prioritizing means for control of messages in queues/buffers; and framing means for delimiting message information from non-message information in said B-channels.

3. Apparatus as recited in claim 2 wherein data communicated between said terminal units is framed in packets, including:

a destination address;

a source address; and a data field; and wherein each said terminal unit can interpret the destination address portion of messages received from either said first or said second B-channel by
determining if the destination address value equals the local address, and if so, retaining the message in said terminal for processing, and
determining if the destination address value is not equal to the local address, and if not, directing the message to a transmit buffer/queue.

4. Apparatus as recited in claim 2 wherein said decoding means interacts with said buffering means for receiving and transmitting messages from/to the B-channels according to said prioritizing means for control of messages in the transmit queue, such that locally generated messages can take precedence over broadcast messages received from the ring but addressed to a terminal unit other than the local terminal unit.

5. Apparatus as recited in claim 2 wherein said encoding means includes:
   means to construct a destination address portion of a message;
   means to construct a source address portion of the message, said source address corresponding to the address of the local terminal unit;
   means to associate the data portion of any message with the addressing portion of the message; and
   means for framing the message, including address and data portions, and to insert said message into either B-channel connected to said terminal unit.

6. Apparatus as recited in claim 3 wherein each said terminal unit decodes the source address of each incoming message, and if the source address value of the incoming message is equal to the local address value associated with the terminal unit, discards said message, else said terminal unit proceeds to analyze the destination address of said incoming message such that if said destination address is equal to said local address, said message is copied to the local processing queue maintained by said local terminal, or if said destination address is not equal to said local address, then said message is copied to the local transmit buffer maintained by said local terminal unit, said message to be retransmitted over said ring network.

7. Apparatus as recited in claim 6 wherein if the destination address of an incoming message is equal to a predetermined broadcast address, the incoming address is discarded, if the source address is equal to the local address of the terminal unit, else said incoming message is copied both to the local message processing queue of the terminal unit and also to the local transmit queue for rebroadcasting over the B-channel in the same direction as said received incoming message.

8. Apparatus as recited in claim 1 including means for detection of disconnection of either B-channel from a local terminal unit, and including means to transmit an alerting message over the remaining B-channel that is still connected to the local terminal unit, the alerting message being either broadcast to all terminal units still on the ring or addressed to any neighboring terminal units still connected by said first B-channel.

9. A Wide Area Network comprising a plurality of communications terminal units, each having first and second communications channels capable of simultaneously receiving and transmitting information in synchronous, full duplex mode; said terminal units being interconnected by a communications network in a ring-like fashion such that a second channel of a first terminal unit is coupled to the first channel of a second terminal unit, the second channel of which is coupled to the first channel of a third terminal unit, the second channel of which is coupled to the first channel of an $n^{th}$ terminal unit, the second channel of which is coupled to the first channel of said first terminal unit, thereby completing a continuous communication ring, said ring forming two counter-circulating synchronous data streams, each of which carries analog, packet or idle data.

10. A Wide Area Network as recited in claim 9, wherein said communications network is formed by the public ISDN network and provides synchronous B-channel switched connectivity under local control of each said terminal unit.

11. A Wide Area Network as recited in claim 10, wherein said plurality of communications terminal units are sequentially connected together to establish said ring and wherein the "next" terminal unit in establishing said ring is determined statically by table look up of a directory number used for connecting to the "next" terminal unit via ISDN B-channel.

12. A Wide Area Network as recited in claim 10, wherein the "next" terminal unit in establishing said ring is determined dynamically by the "last" terminal unit after it is connected to the "current" terminal unit.

13. A Wide Area Network as recited in claim 12, wherein the "last" terminal unit communicates the identity of the "next" terminal unit to the "current" terminal unit via the B-channel connection between the two terminal units via either DTMF, voice, HDLC or other messaging schemes.

14. A Wide Area Network as recited in claim 12 wherein the "last" terminal unit communicates the identity of the "next" terminal unit to the "current" terminal unit via the D-channel, via either the User-User-information element or X.25 packet communications.

15. A Wide Area Network as recited in claim 9 wherein each said terminal unit includes:
   computer means;
   interfacing adapter means associated with said computer means and operative to communicate data between said computer means and network termination means associated with said communications network; and
   application software for execution by said computer means and operative to cause said adapter means to perform an initial call establishment procedure with a "last" terminal unit to enable communication therewith over a first ISDN synchronous B-channel, and to perform an automatic "next"-link establishment procedure with a "next" terminal unit, and to enable communication therewith over a second ISDN synchronous B-channel and to conduct simultaneous bi-directional communications with the "last" and "next" terminal units via said first and second B-channels.

16. A Wide Area Network as recited in claim 15, wherein said adapter means includes:
   means for interfacing to said ISDN synchronous B-channels via signaling D-channel packets;
   buffering means for receiving and transmitting messages from/to said B-channels;
   decoding means for analyzing address portions of received messages for local and broadcast connections;
   encoding means for constructing address portions of messages for local and broadcast communications over said B-channels;
   authentication means for validating ring security during the conduct of said next-link establishment procedure;
   prioritizing means for control of messages in queues/buffers; and
   framing means for delimiting message information from non-message information in said B-channels.

17. A Wide Area Network as recited in claim 16 wherein data communicated between said terminal units is framed in packets including:
   a destination address;
   a source address; and
   a data field; and
   wherein each said terminal unit can interpret the destination address portion of messages received from either said first or said second B-channel by
      determining if the destination address value equals the local address, and if so, retaining the message in said terminal for processing, and determining if the destination address value is not equal to the local address, and if not, directing the message to a transmit buffer/queue.

18. A Wide Area Network as recited in claim 16, wherein said encoding means includes:

means to construct a destination address portion of a message;

means to construct a source address portion of the message, said source address corresponding to the address of the local terminal unit;

means to associate the data portion of any message with the addressing portion of the message; and means for framing the message, including address and data portions, and to insert said message into either B-channel connected to said terminal unit.

19. A Wide Area Network as recited in claim 17, wherein each said terminal unit decodes the source address of each incoming message, and if the source address value of the incoming message is equal to the local address value associated with the terminal unit, discards said message, else said terminal unit proceeds to analyze the destination address of said incoming message such that if said destination address is equal to said local address, said message is copied to the local processing queue maintained by said local terminal, or if said destination address is not equal to said local address, then said message is copied to the local transmit buffer maintained by said local terminal unit, said message to be retransmitted over said ring network.

20. A Wide Area Network as recited in claim 15, including means for detection of disconnection of each B-channel from a local terminal unit, and including means to transmit an alerting message over the remaining B-channel that is still connected to the local terminal unit, the alerting message being either broadcast to all terminal units still on the ring or addressed to any neighboring terminal units still connected by said first B-channel.

* * * * *